US012385510B2

(12) United States Patent
Chen

(10) Patent No.: US 12,385,510 B2
(45) Date of Patent: Aug. 12, 2025

(54) TOLERANCE COMPENSATION FASTENING ASSEMBLY

(71) Applicant: Illinois Tool Works Inc., Glenview, IL (US)

(72) Inventor: Bin Chen, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 161 days.

(21) Appl. No.: 18/089,669

(22) Filed: Dec. 28, 2022

(65) Prior Publication Data

US 2023/0204055 A1 Jun. 29, 2023

(30) Foreign Application Priority Data

Dec. 29, 2021 (CN) .......................... 202111638397.3
Dec. 16, 2022 (CN) .......................... 202211626847.1

(51) Int. Cl.
*F16B 5/02* (2006.01)
(52) U.S. Cl.
CPC ............ *F16B 5/025* (2013.01); *F16B 5/0233* (2013.01)
(58) Field of Classification Search
CPC ...... F16B 5/025; F16B 5/0233; F16B 5/0225; F16B 5/0628
USPC ................................................. 411/368, 546
See application file for complete search history.

(56) References Cited

U.S. PATENT DOCUMENTS

| 11,571,773 | B1* | 2/2023 | Robertson, Jr. ......... B23P 19/10 |
| 2015/0330435 | A1* | 11/2015 | Schwarzbich ........ F16B 5/0283 411/16 |
| 2017/0152876 | A1* | 6/2017 | Erpenbeck ............ F16B 37/043 |
| 2017/0276165 | A1* | 9/2017 | Matsunami ........... F16B 5/0233 |
| 2020/0072263 | A1* | 3/2020 | Wang ...................... F16B 4/004 |
| 2020/0248733 | A1* | 8/2020 | Figge .................... F16B 5/0233 |
| 2020/0325685 | A1* | 10/2020 | Figge ...................... E04B 1/388 |
| 2020/0400173 | A1* | 12/2020 | Figge ...................... F16B 5/025 |
| 2021/0039720 | A1* | 2/2021 | Mosch .................. B62D 27/02 |

(Continued)

FOREIGN PATENT DOCUMENTS

| DE | 202018101519 U1 * | 5/2018 | ............ F16B 21/088 |
| DE | 112018004895 T5 * | 6/2020 | ................ F16B 5/02 |

(Continued)

*Primary Examiner* — Kristina R Fulton
*Assistant Examiner* — Jock Wong
(74) *Attorney, Agent, or Firm* — McAndrews, Held & Malloy, Ltd.

(57) ABSTRACT

The present disclosure provides a tolerance compensation fastening assembly for fastening a first component to a second component which comprises a first compensation element and a second compensation element. The first compensation element comprises a first support portion which is provided with a first receiving hole that receives a shank of a fastener, and is connectable to the first component and movable relative to the first component in a longitudinal direction. The second compensation element comprises a second support portion which is provided with a second receiving hole that receives the shank of the fastener and is connectable to the first component and movable relative to the first component in at least one transverse direction perpendicular to the longitudinal direction. The first support portion and the second support portion are subjected to an axial fastening force applied by the fastener, and are at least partially made of metal.

11 Claims, 9 Drawing Sheets

(56) References Cited

U.S. PATENT DOCUMENTS

| | | | |
|---|---|---|---|
| 2021/0071696 A1* | 3/2021 | Gagliardi | ............... B60Q 1/045 |
| 2022/0065284 A1* | 3/2022 | Li | ......................... F16B 37/042 |
| 2022/0299051 A1* | 9/2022 | Bente | .................... F16B 5/0233 |

FOREIGN PATENT DOCUMENTS

| | | | | |
|---|---|---|---|---|
| DE | 102019110201 A1 | * | 10/2020 | .............. F16B 37/12 |
| EP | 1731772 A2 | * | 12/2006 | ............ F16B 5/0233 |
| JP | 2008256058 A | * | 10/2008 | ............ F16B 5/0233 |
| WO | WO-2019046079 A1 | * | 3/2019 | ................ F16B 5/02 |

* cited by examiner

TOLERANCE COMPENSATION FASTENING ASSEMBLY

CROSS-REFERENCE

The present application claims the benefit of Chinese Patent Application Nos. 202111638397.3, filed Dec. 29, 2021, and 202211626847.1, filed Dec. 16, 2022, each titled "Tolerance Compensation Fastening Assembly," the contents of which are hereby incorporated by reference.

TECHNICAL FIELD

Embodiments of the present disclosure relate generally to a tolerance compensation fastening assembly, and more particularly to a fastening assembly capable of compensating for a tolerance and configured to fasten a first component to a second component.

BACKGROUND

A fastening assembly with a tolerance compensating function can compensate for tolerances caused by manufacturing and mounting while fastening two components. Such a fastening assembly generally includes threaded fastening elements, and the fastening between the components is achieved by the torque of the threaded fastening elements. In the existing fastening assemblies, components other than the threaded fastening elements are generally made of plastic.

SUMMARY

The present disclosure provides a tolerance compensation fastening assembly for fastening a first component to a second component. The tolerance compensation fastening assembly comprises a first compensation element and a second compensation element. The first compensation element comprises a first support portion. The first support portion is provided with a first receiving hole. The first receiving hole is configured to receive a shank of a fastener. The first compensation element is configured to be connectable to the first component and movable relative to the first component in a longitudinal direction. The second compensation element comprises a second support portion. The second support portion is provided with a second receiving hole. The second receiving hole is configured to receive the shank of the fastener. The second support portion is configured to be connectable to the first component and movable relative to the first component in at least one transverse direction perpendicular to the longitudinal direction. The first support portion and the second support portion are configured to be subjected to an axial fastening force applied by the fastener, and the first support portion and the second support portion are at least partially made of metal.

The tolerance compensation fastening assembly according to the above further comprises the fastener. The fastener comprises a bolt and a nut. The bolt comprises the shank and a radial bolt extension radially extending from the shank. The nut comprises a threaded connection and a radial nut extension radially extending from the threaded connection, and the threaded connection being threadedly connected to the shank. The first support portion and the second support portion are located between the radial bolt extension and the radial nut extension, and parts of the first support portion and the second support portion that overlap with the radial bolt extension and the radial nut extension in the longitudinal direction are at least partially made of metal.

In the tolerance compensation fastening assembly according to the above, the first support portion comprises a first metal ring part and a first plastic part. The first metal ring part is connected to the first plastic part. The second support portion comprises a second metal ring part and a second plastic part. The second metal ring part is connected to the second plastic part. The first metal ring part and the second metal ring part at least partially overlap with the radial bolt extension and the radial nut extension in the longitudinal direction.

In the tolerance compensation fastening assembly according to the above, the first metal ring part of the first support portion is integrally formed with the first plastic part through an insert injection molding process, or is connected to the first plastic part through an assembly process. The second metal ring part of the second support portion is integrally formed with the second plastic part through an insert injection molding process, or is connected to the second plastic part through an assembly process.

The tolerance compensation fastening assembly according to the above further comprises an insertion end configured to be inserted into the first component and an operation end opposite to the insertion end, and limiting means. The insertion end is formed by one of the bolt and the nut, and the operation end is formed by the other of the bolt and the nut. The one of the bolt and the nut that forms the insertion end comprises an introduction position and a locked position and is configured to be rotatable between the introduction position and the locked position. The one of the bolt and the nut that forms the insertion end comprises a mating portion. The limiting means are structures provided on the second support portion around the second receiving hole, and the limiting means are configured to mate with the mating portion to define the introduction position and the locked position.

In the tolerance compensation fastening assembly according to the above, the limiting means comprises a first-direction limiting edge and a second-direction limiting edge opposite to each other, and a rotation space defined between the first-direction limiting edge and the second-direction limiting edge and in communication with the second receiving hole. The first-direction limiting edge corresponds to the introduction position, and the second-direction limiting edge corresponds to the locked position. The one of the bolt and the nut that forms the insertion end is rotatable in the rotation space.

The tolerance compensation fastening assembly according to the above further comprises retaining means. The retaining means are configured to mate with the mating portion such that the one of the bolt and the nut that forms the insertion end is retained in the introduction position when the operation end is subjected to a rotational force that is less than a preset threshold.

In the tolerance compensation fastening assembly according to the above, the retaining means comprise a retainer arranged between the first support portion and the second support portion, and the second support portion mates with the retainer to limit the rotation of the retainer relative to the second support portion. Part of the retainer that overlaps with the first support portion, the second support portion, the radial bolt extension and the radial nut extension in the longitudinal direction is at least partially made of metal.

In the tolerance compensation fastening assembly according to the above, the retaining means comprise structures provided on the second support portion around the second receiving hole.

In the tolerance compensation fastening assembly according to the above, the retaining means and the limiting means are arranged at different axial positions of the tolerance compensation fastening assembly, and the retaining means comprise at least two retaining ribs. The at least two retaining ribs are made of plastic and configured to be deformable when subjected to a certain rotational force. The mating portion comprises at least one edge, and the at least one edge is retainable between the at least two retaining ribs.

In the tolerance compensation fastening assembly according to the above, the retaining means and the limiting means are arranged at the same axial position of the tolerance compensation fastening assembly, and the retaining means comprises a retaining protrusion located between the opposite first-direction limiting edge and second-direction limiting edge. The retaining protrusion is made of plastic and configured to be deformable when subjected to a certain rotational force. The mating portion comprises at least one edge, and the at least one edge is retained between the first-direction limiting edge and the retaining protrusion.

In the tolerance compensation fastening assembly according to the above, the first compensation element comprises a tubular main body portion, and the first support portion is an annular flange arranged at one end of the tubular main body portion. The tubular main body portion is provided with a threaded portion on an outer surface thereof, and the first compensation element is connected to the first component via the threaded portion of the tubular main body portion. The second compensation element further comprises a pair of elastic connecting arms respectively located on opposite sides of the second support portion, and the second support portion is connected to the first component via the pair of elastic connecting arms.

DETAILED DESCRIPTION

Various specific embodiments of the present disclosure are described below with reference to the accompanying drawings which constitute part of this description. It is to be understood that although the terms indicating orientations, such as "front", "rear", "upper", "lower", "left", "right", "top" and "bottom", are used in the present disclosure to describe structural parts and elements in various examples of the present disclosure, these terms are used herein only for ease of illustration and are determined based on the exemplary orientations shown in the accompanying drawings. Since the embodiments disclosed in the present disclosure can be arranged in different directions, these terms indicating directions are only illustrative and should not be considered as limitations.

Embodiments of the present disclosure provide a tolerance compensation fastening assembly for fastening a first component (e.g., a hidden door handle module of a vehicle)

to a second component (e.g., a vehicle door). The tolerance compensation fastening assembly also has a tolerance compensating function and thus can compensate for tolerances caused by the manufacturing and mounting of components.

Figure 1A:
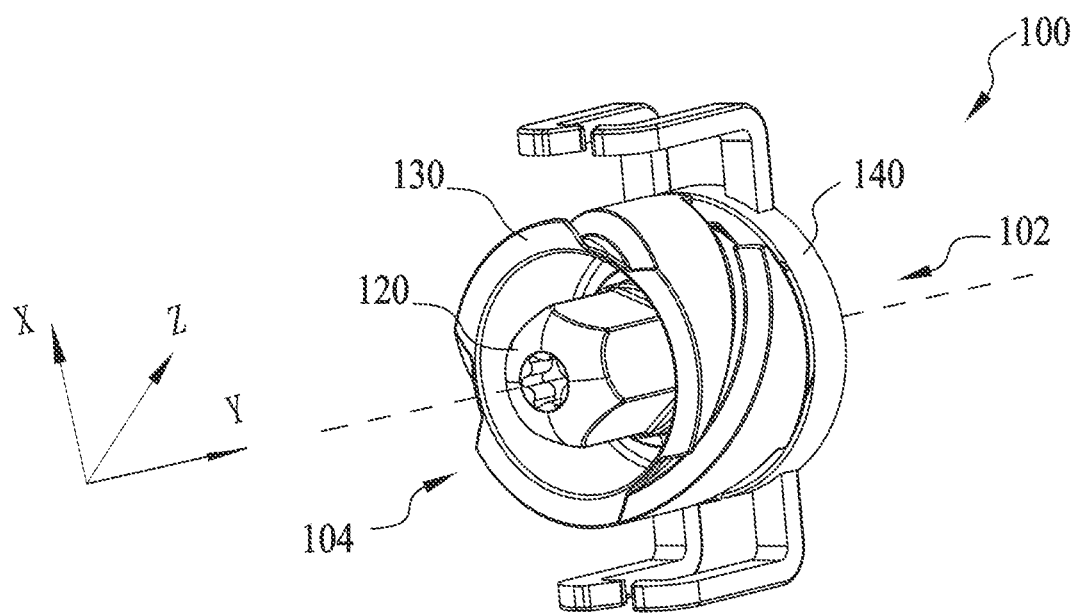
FIG. 1A is a perspective view of a tolerance compensation fastening assembly according to an embodiment of the present disclosure.
Figure 1B:
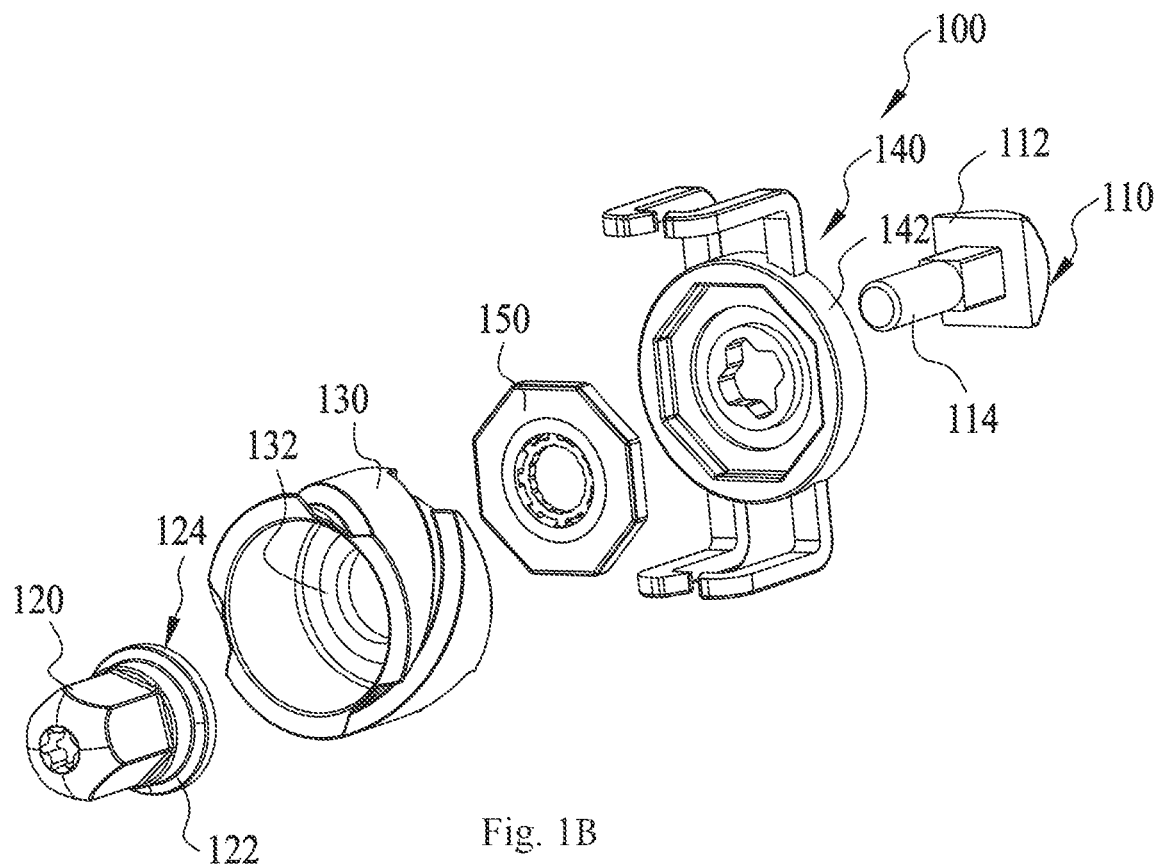
FIG. 1B is an exploded view of the tolerance compensation fastening assembly shown in FIG. 1A.

FIGS. 1A and 1B show the overall structure of a tolerance compensation fastening assembly 100 according to an embodiment of the present disclosure. FIG. 1A is a perspective view of the tolerance compensation fastening assembly 100, and FIG. 1B is an exploded view of the tolerance compensation fastening assembly 100. As shown in FIGS. 1A and 1B, the tolerance compensation fastening assembly 100 includes a fastener formed by a bolt 110 and a nut 120 mating with each other, a first compensation element 130, a second compensation element 140, and a retainer 150 forming retaining means. The bolt 110 includes a shank 114 having an external thread and a radial bolt extension 112 radially extending from the shank 114. The nut 120 includes a threaded connection 124 in the form of an internal thread and a radial nut extension 122 radially extending from the threaded connection 124. The first compensation element 130 includes a first support portion 132, and the second compensation element 140 includes a second support portion 142. Through the threaded engagement of the shank 114 of the bolt 110 and the threaded connection 124 of the nut 120, the first support portion 132 of the first compensation element 130, the second support portion 142 of the second compensation element 140 and the retainer 150 are retained between the radial bolt extension 112 and the radial nut extension 122, with the retainer 150 being located between the first support portion 132 and the second support portion 142. For the assembled tolerance compensation fastening assembly 100 (shown in FIG. 1A), the first compensation element 130 and the second compensation element 140 are first connected to a first component 820 (shown in FIG. 8A) so as to be pre-assembled to the first component 820, the radial bolt extension 112 is then inserted into a second component 840 (as shown in FIG. 8A), and finally the first component 820 is fastened to the second component 840 by tightening the nut 120 and the bolt 110. When the tolerance compensation fastening assembly 100 is in a state where the first component 820 and the second component 840 are fastened, the first support portion 132 of the first compensation element 130, the second support portion 142 of the second compensation element 140 and the retainer 150 are subjected to an axial fastening force exerted by the fastener. The tolerance compensation fastening assembly 100 can compensate for tolerances in a longitudinal direction Y and in at least one transverse direction X, Z perpendicular to the longitudinal direction Y. The shank 114 of the bolt 110 extends in the longitudinal direction Y.

Still as shown in FIGS. 1A and 1B, the end of the tolerance compensation fastening assembly 100 for insertion into the second component 840 is an insertion end 102, and the end opposite to the insertion end 102 is an operation end 104. In the embodiment shown in FIGS. 1A and 1B, the insertion end 102 of the fastening element 100 is formed by the bolt 110, more particularly by the radial bolt extension 112, and the operation end 104 is formed by the nut 120. By performing a rotating operation on the operation end 104, the bolt 110 and the nut 120 can be tightened to each other after the insertion end 102 is inserted into the second component 840, thereby fastening the first component 820 to the second component 840. It should be noted that, although in the embodiment shown in FIGS. 1A and 1B, the bolt 110 forms the insertion end 102 of the tolerance compensation fastening assembly 100 and the nut 120 forms the operation end 104 of the tolerance compensation fastening assembly 100, according to the present disclosure, the positions of the bolt 110 and the nut 120 can be interchanged so that the insertion end 102 of the tolerance compensation fastening assembly 100 is formed by the nut 120 and the operation end 104 of the tolerance compensation fastening assembly 100 is formed by the bolt 110. They are both within the scope of protection of the present disclosure.

Figure 2A:
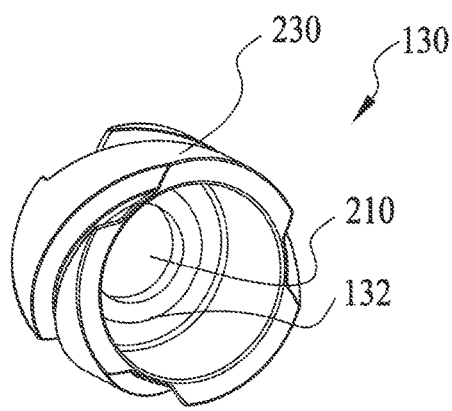
FIG. 2A is a perspective view of a first compensation element of the tolerance compensation fastening assembly shown in FIG. 1B.
Figure 2B:
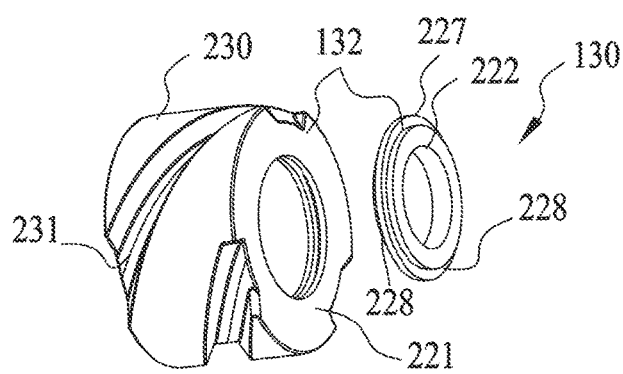
FIG. 2B is an exploded view of the first compensation element shown in FIG. 2A.

FIGS. 2A and 2B show the specific structures of the first compensation element 130. FIG. 2A is a perspective view of the first compensation element 130, and FIG. 2B is an exploded view of the first compensation element 130. As shown in FIGS. 2A and 2B, the first compensation element 130 includes a tubular main body portion 230 and a first support portion 132 arranged at one end of the tubular main body portion 230, and the first support portion 132 is an annular flange protruding and extending inwardly from one end of the tubular main body portion 230. The first support portion 132 is provided with a first receiving hole 210 for receiving the shank 114 of the bolt 110. The tubular main body portion 230 is provided with an external thread 231 on an outer surface thereof. The external thread 231 is configured to engage with an internal thread on the first component 820, so as to connect the first compensation element 130 to the first component 820, and enable the first compensation element 130 to move relative to the first component 820 in the longitudinal direction Y.

Figure 7:
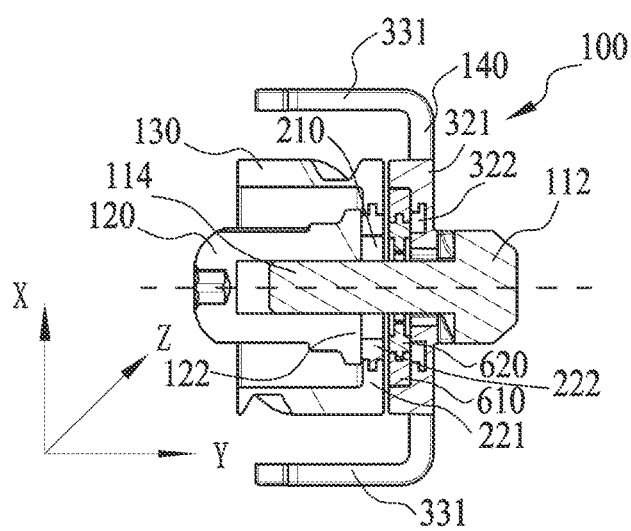
FIG. 7 is an axial cross-sectional view of the tolerance compensation fastening assembly shown in FIG. 1A.

At least a part of the first support portion 132 of the first compensation element 130 is made of metal, while the other part is made of plastic together with the tubular main body portion 230. In some embodiments, for example, as shown in FIG. 2B, the first support portion 132 includes a first metal ring part 222 and a first plastic part 221. The first metal ring part 222 is surrounded by the first plastic part 221, and the first plastic part 221 is connected to the end of tubular main body portion 230. The first metal ring part 222 may be connected to the first plastic part 221 in various ways, such as being integrally formed with the first plastic part through an insert injection molding process, or being connected to the first plastic part through an assembly process. The first metal ring part 222 has an outer periphery 227 connected to the first plastic part 221, and end surfaces 228 of the first metal ring part on two opposite sides of the outer periphery 227 are exposed without being covered by the first plastic part 221, so that in the fastened state of the tolerance compensation fastening assembly 100, the first metal ring part 222 can be in contact with the components (i.e., the radial nut extension 122 and the retainer 150, as shown in FIG. 7) adjacent to the first support portion 132 in the longitudinal direction Y.

Figure 3A:
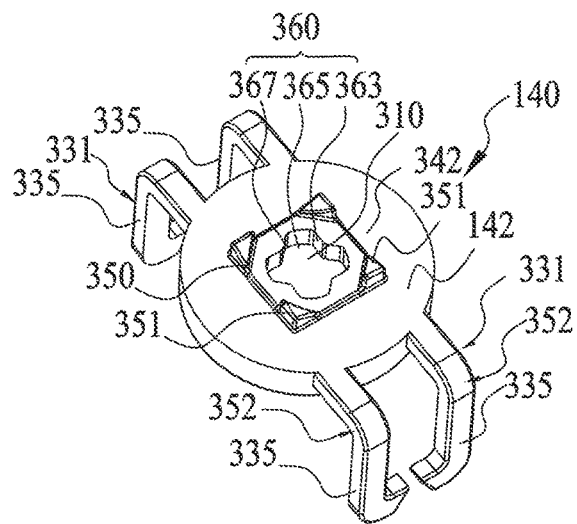
FIG. 3A is a perspective view of a second compensation element of the tolerance compensation fastening assembly shown in FIG. 1B.
Figure 3B:
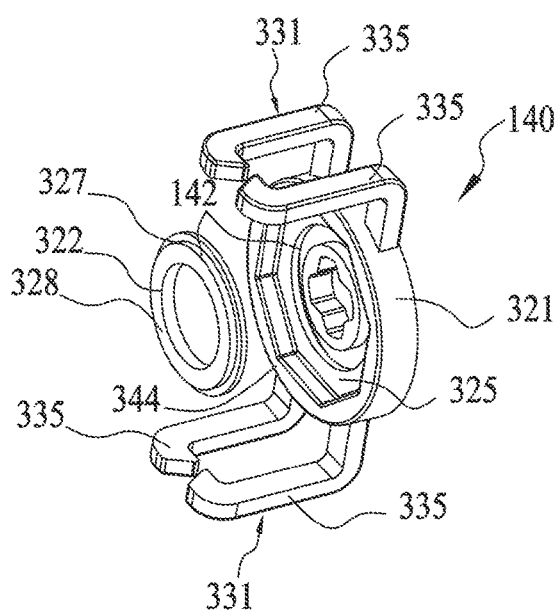
FIG. 3B is an exploded view of the second compensation element shown in FIG. 3A.

FIGS. 3A and 3B show the specific structures of the second compensation element 140. FIG. 3A is a perspective view of the second compensation element 140, and FIG. 3B is an exploded view of the second compensation element 140. As shown in FIGS. 3A and 3B, the second compensation element 140 includes a second support portion 142 and a pair of elastic connecting arms 331. The second support portion 142 is generally disc-shaped, and the pair of elastic connecting arms 331 are respectively located on two opposite sides of the second support portion 142. The pair of elastic connecting arms 331 are configured to connect the second support portion 142 to the first component 820.

The second support portion 142 is provided with a second receiving hole 310 for receiving the shank 114 of the bolt 110. The second support portion 142 includes a front side surface 342 and a rear side surface 344 opposite to each other. The second receiving hole 310 extends through the front side surface 342 and the rear side surface 344 in the longitudinal direction Y. The second support portion 142 includes an accommodation cavity 325 formed by inwardly recessing the rear side surface 344 toward the front side surface 342. The accommodation cavity 325 can accommodate the retainer 150, and limit the rotation of the retainer 150 relative to the second support portion 142 by means of a form fit. The retainer 150 can limit the rotation of the bolt 110 when the nut 120 is subjected to a rotational force that is less than a preset threshold so as to retain the bolt 110 in its introduction position, and release the bolt 110 when the nut 120 is subjected to a rotational force that is greater than a preset threshold so that the bolt can be rotated from the introduction position to a locked position, which will be illustrated with reference to FIG. 6.

The second support portion 142 further includes limiting means 360 arranged at the second receiving hole 310. The limiting means 360 can mate with a mating portion 415 (as shown in FIG. 4B) of the bolt 110 to define the introduction position and the locked position of the bolt 110. The number of the limiting means 360 matches the number of mating structures on the mating portion 415, and is four in the embodiment shown in the figures. The four limiting means 360 are arranged rotationally symmetrically around the center of the second receiving hole 310. Each limiting means 360 includes a first-direction limiting edge 363 and a second-direction limiting edge 367 opposite to each other, and a rotation space 365 defined between the first-direction limiting edge 363 and the second-direction limiting edge 367 and in communication with the second receiving hole 310. The first-direction limiting edge 363 and the second-direction limiting edge 367 respectively correspond to the locked position and the introduction position of the bolt 110, and the mating portion 415 (shown in FIG. 4B) of the bolt 110 can rotate in the rotation space 365. When the bolt 110 is in the introduction position, the mating portion 415 of the bolt 110 abuts against the first-direction limiting edge 363, thereby blocking the bolt 110 from leaving the introduction position in a first direction from the locked position to the introduction position; and when the bolt 110 is in the locked position, the mating portion 415 of the bolt 110 abuts against the second-direction limiting edge 367, thereby blocking the bolt 110 from leaving the locked position in a second direction from the introduction position to the locked position.

The second support portion 142 further includes a position indicator 350 arranged on the front side surface 342 for providing a visual indication of whether the bolt 110 is in the introduction position. The position indicator 350 is shaped to indicate the position in which the radial bolt extension 112 of the bolt 110 needs to be located when inserted into the second component 840. In some embodiments (e.g., shown in FIGS. 4A and 4B), the radial bolt extension 112 includes four corners 411. The four corners 411 are uniformly arranged around the radial bolt extension 112. The position indicator 350 includes four protrusion portions 351 arranged around the second receiving hole 310. The four protrusion portions 351 are arranged to be respectively aligned with the four corners 411 of the radial bolt extension 112 when the radial bolt extension 112 is in the introduction position. The protrusion portion 351 also has the shape of a corner. When the four corners 411 of the radial bolt extension 112 are respectively aligned with the four protrusion portions 351 of the position indicator 350, it can be determined that the radial bolt extension 112 is in the introduction position.

Figure 8B:
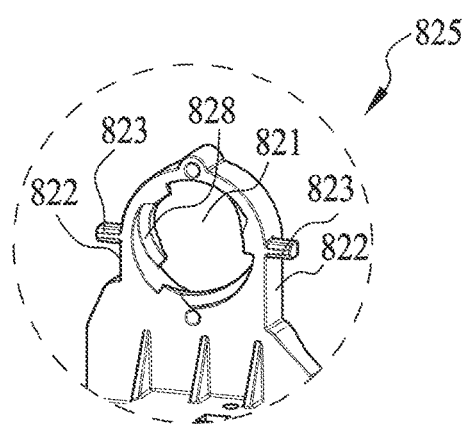
FIG. 8B is a partially enlarged view of FIG. 8A.
Figure 8A:
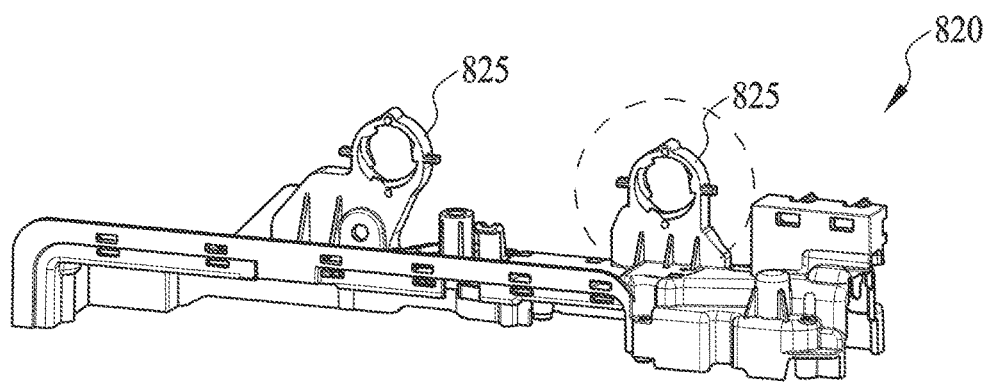
FIG. 8A is a partial perspective view of a first component using the tolerance compensation fastening assembly in FIG. 1A.

In some embodiments, each of the pair of elastic connecting arms 331 forms a hanging ear-like shape, and has a proximal end connected to the second support portion 142 and a distal end configured to hang on a protrusion 823 of the first component 820 (see FIG. 8B). Specifically, each elastic connecting arm 331 includes two support arms 352 parallel to each other and spaced apart from each other, and the distance between the two support arms 352 is set such that the protrusion 823 of the first component 820 can be accommodated. Each support arm 352 first extends from the second support portion 142, and then generally extends in the longitudinal direction Y in a direction away from the front side surface 342 of the second support portion 142. In this way, each elastic connecting arm 331 has a retaining section 335 extending generally in the longitudinal direction Y, and the distance between the retaining sections 335 of the two elastic connecting arms 331 is set such that a mounting tab 825 (see FIG. 8B) of the first component 820 can be accommodated. The elastic connecting arm 331 is elastic and can be deformed when being stressed, so that the second support portion 142 is movable in the transverse directions X, Z relative to the first component 820.

At least a part of the second support portion 142 of the second compensation element 140 is made of metal, while the other part is made of plastic together with the elastic connecting arms 331. In some embodiments, for example, as shown in FIG. 3B, the second support portion 142 includes a second metal ring part 322 and a second plastic part 321. The second metal ring part 322 is surrounded by the second plastic part 321. The second metal ring part 322 may be connected to the second plastic part 321 in various ways, such as being integrally formed with the second plastic part through an insert injection molding process, or being connected to the second plastic part through an assembly process. The second metal ring part 322 has an outer periphery 327 connected to the second plastic part 321, and end surfaces 328 of the second metal ring part on two opposite sides of the outer periphery 327 are exposed without being covered by the second plastic part 321, so that in the fastened state of the tolerance compensation fastening assembly 100, the end surfaces 328 of the second metal ring part 322 can be in contact with adjacent components.

Figure 4A:
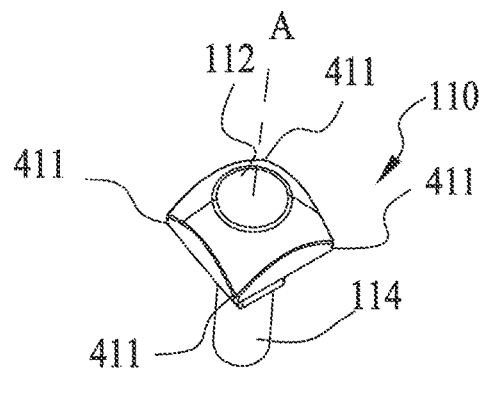
FIG. 4A is a perspective view of a bolt of the tolerance compensation fastening assembly shown in FIG. 1B from one perspective.
Figure 4B:
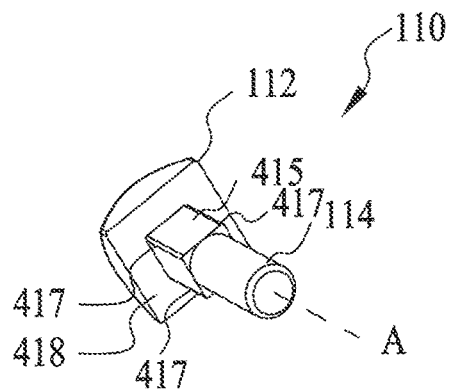
FIG. 4B is a perspective view of the bolt shown in FIG. 4A from another perspective.

FIGS. 4A and 4B show the specific structures of the bolt 110. FIG. 4A is a perspective view of the bolt 110 from one perspective, and FIG. 4B is a perspective view of the bolt 110 from another perspective. As shown in FIGS. 4A and 4B, the bolt 110 further includes a mating portion 415 arranged on the shank 114. The mating portion 415 is configured to mate with the retainer 150 to retain the radial bolt extension 112 in the introduction position, and to mate with the limiting means 360 to define the introduction position and the locked position of the bolt 110. Specifically, the shank 114 extends in the longitudinal direction Y and is generally cylindrical. The shank 114 has a central axis A and an external thread arranged on its outer surface. The mating portion 415 protrudes outwardly from the shank 114. The mating portion 415 is generally prism-shaped, and its cross-section perpendicular to the central axis A is not a circle, but a polygon with corners, such as a square as shown in FIGS. 4A and 4B. The mating portion 415 therefore has several edges 417 arranged around the central axis A. The diameter of the shank 114 is substantially equal to the minimum side length of the cross-section of the mating portion 415. The radial bolt extension 112 is generally in the shape of a truncated cone, with a smaller top dimension and a larger bottom dimension, and its bottom side edge is cut away in the direction of the central axis A, so that the radial bolt extension 112 has four corners 411, and its bottom surface 418 is substantially in the form of a square perpendicular to the central axis A. That is to say, the cross-section of the radial bolt extension 112 in the direction perpendicular to the central axis A is largest at the bottom surface 418. The bottom surface 418 is not circular but polygonal, so that the bottom surface has multiple dimensions. Its minimum dimension is the side length and its maximum dimension is the diagonal. The bolt 110 has the introduction position and the locked position according to the orientation of the radial bolt extension 112, and can be rotated between the introduction position and the locked position. In the introduction position, the radial bolt extension 112 can be inserted into a hole 845 (see FIG. 8D) of the second component 840, while in the locked position, the radial bolt extension 112 cannot be withdrawn from the hole 845 of the second component 840, thereby locking the bolt 110 relative to the second component 840.

Figure 5:
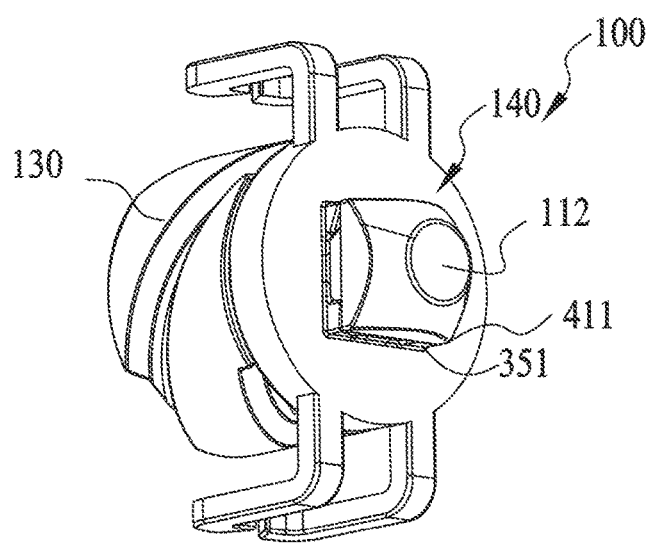
FIG. 5 is a perspective view of the tolerance compensation fastening assembly shown in FIG. 1A with its insertion end in an introduction position.

FIG. 5 is a perspective view of the tolerance compensation fastening assembly 100 with the bolt 110 in the introduction position. As shown in FIG. 5, the four corners 411 of the radial bolt extension 112 are respectively aligned with the four protrusion portions 351 of the position indicator 350 of the second compensation element 140. This indicates that the bolt 110 is in the introduction position, and its radial bolt extension 112 can be inserted into the hole 845 of the second component 840. After the bolt 110 is rotated about the central axis A in the first direction, the bolt 110 leaves its introduction position and reaches the locked position. Since the radial bolt extension 112 is inserted into the hole 845 of the second component 840 and rotated, the corners 411 of the radial bolt extension 112 will make it impossible for the radial bolt extension 112 to be withdrawn from the hole 845.

Figure 6:
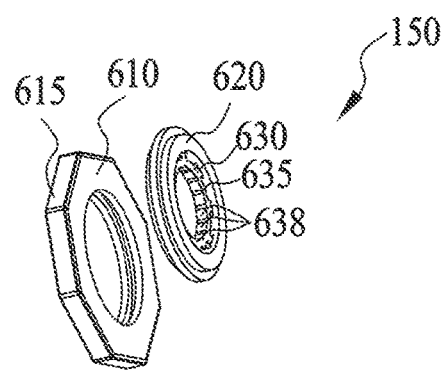
FIG. 6 is an exploded view of a retainer of the tolerance compensation fastening assembly shown in FIG. 1B.

FIG. 6 is a partially exploded view of the retainer 150 shown in FIG. 1B. As shown in FIG. 6, the retainer 150 forms the retaining means for retaining the bolt 110 in its introduction position. At least a part of the retainer 150 is made of metal, while the other part is made of plastic. As shown in FIGS. 1B and 6, the retainer 150 has a receiving hole 650 for receiving the shank 114 of the bolt 110. The retainer 150 includes a metal ring part 610 surrounding the receiving hole 650, and a plastic part 620. The plastic part 620 is surrounded by the metal ring part 610. The metal ring part 610 may be connected to the plastic part 620 in various ways, such as being integrally formed with the plastic part through an insert injection molding process, or being connected to the plastic part through an assembly process.

As shown in FIG. 6, the retainer 150 further includes an engagement ring 630 mounted in the plastic part 620. The engagement ring 630 has an inside engagement surface 635. The inside engagement surface 635 defines the receiving hole 650. The inside engagement surface 635 is provided with several retaining ribs 638. The number of retaining ribs 638 are arranged around the receiving hole 650. Each retaining rib 638 protrudes toward a central axis of the receiving hole 650 and extends in the longitudinal direction Y. The engagement ring 630 is made of plastic so that the retaining ribs 638 can be deformed when subjected to a certain rotational force. The distance between adjacent retaining ribs 638 is set such that the edge 417 of the mating portion 415 of the bolt 110 can be retained between adjacent ribs 638, so that the bolt 110 is retained in the introduction position when the bolt 110 is subjected to a rotational force that is less than a preset threshold, and the bolt 110 can be released when the bolt 110 is subjected to a rotational force that is greater than a preset threshold so that the bolt can be rotated to the locked position.

In addition, as shown in FIG. 6, the retainer 150 further has an outside engagement surface 615. The outside engagement surface 615 is configured to engage with the accommodation cavity 325 of the second compensation element 140 to limit the rotation of the retainer 150 relative to the second compensation element 140. The outside engagement surface 615 is formed on the metal ring part 610 of the retainer 150 as an outside annular surface of the metal ring part 610. The outside engagement surface 615 is formed in a prism shape, a side wall of the accommodation cavity 325 is also formed in a matching prism shape, and the two mate with each other to limit the rotational movement of the retainer 150.

FIG. 7 is an axial cross-sectional view of the tolerance compensation fastening assembly 100 shown in FIG. 1A, for showing the mating relationship between the components in the tolerance compensation fastening assembly 100. As shown in FIG. 7, the shank 114 of the bolt 110 of the tolerance compensation fastening assembly 100 passes through the first support portion 132 of the first compensation element 130, the retainer 150 and the second support portion 142 of the second compensation element 140 in sequence, and is inserted into the threaded connection 124 of the nut 120. The first metal ring part 222 of the first support portion 132 of the first compensation element 130, the metal ring part 610 of the retainer 150, and the second metal ring part 322 of the second support portion 142 of the second compensation element 140 at least partially overlap in the longitudinal direction Y, and they at least partially overlap with the radial bolt extension 112 and the radial nut extension 122 in the longitudinal direction Y. Thus, parts of the first support portion 132 of the first compensation element 130, the retainer 150, and the second support portion 142 of the second compensation element 140 that overlap with the radial bolt extension 112 and the radial nut extension 122 in the longitudinal direction Y are at least partially made of metal. In addition, the diameter of the first receiving hole 210 in the first support portion 132 of the first compensation element 130 of the tolerance compensation fastening assembly 100 is larger than the outer diameter of the shank 114 of the bolt 110, so the shank 114 of the bolt 110 is movable along the radial direction of the receiving hole 210.

Figure 8C:
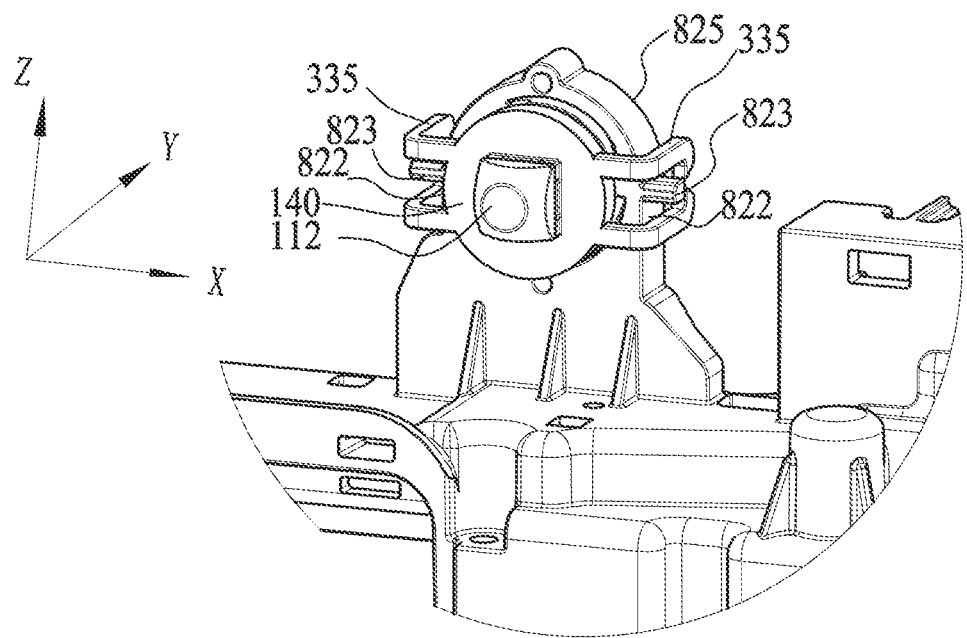
FIG. 8C is a perspective view of the tolerance compensation fastening assembly shown in FIG. 1A and the first component shown in FIG. 8A in a pre-assembled state.
Figure 8D:
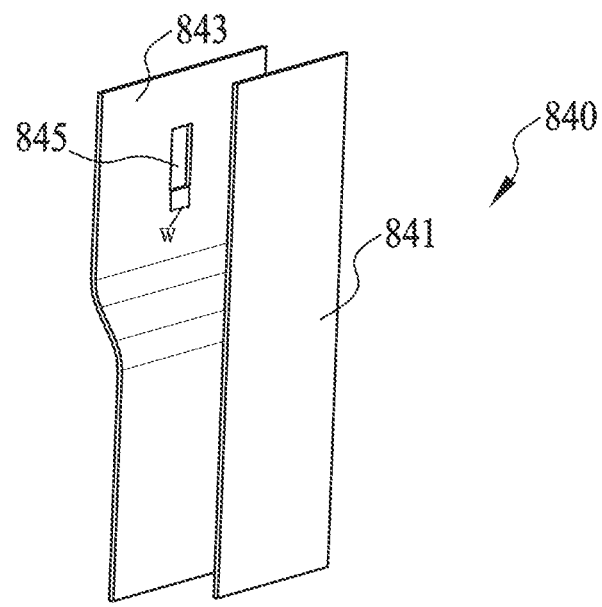
FIG. 8D is a partial perspective view of a second component using the fastener assembly in FIG. 1A.

FIGS. 8A-8D show the specific structures of an exemplary first component 820 and second component 840 using the fastener assembly 100, and show a pre-assembled state of the tolerance compensation fastening assembly 100 on the first component 820. FIG. 8A is a partial perspective view of the first component 820, FIG. 8B is a partially enlarged view of FIG. 8A, FIG. 8C is a perspective view of the tolerance compensation fastening assembly 100 and the first component 820 in the pre-assembled state, and FIG. 8D is a partial perspective view of the second component 840 using the fastener assembly in FIG. 1A.

As shown in FIGS. 8A and 8D, the first component 820 is, for example, a hidden door handle module of a vehicle, and the second component 840 is, for example, a door. The first component 820 is fastened to the second component 840 via the tolerance compensation fastening assembly 100. The second component 840 has an inside element (inner sheet metal) 843 and an outside element (outer sheet metal) 841. The inside element 843 is provided with a hole 845 for receiving the insertion end 102 of the tolerance compensation fastening assembly 100. There are several (e.g., three) mounting tabs 825 on the first component 820, and each mounting tab 825 is mounted to one hole 845 of the second component 840 via one tolerance compensation fastening assembly 100.

As shown in FIG. 8B, the mounting tab 825 of the first component 820 includes a hole 821 penetrating the mounting tab 825 in the longitudinal direction Y, and a pair of side surfaces 822 located on two opposite sides of the hole 821. The mounting tab 825 further includes a pair of protrusions 823 respectively arranged on the pair of side surfaces 822 for mating with the pair of elastic connecting arms 331 of the second compensation element 140 to limit the rotation of the second compensation element 140 relative to the first component 820 and limit the movement distance of the second compensation element 140 relative to the first component 820 in the longitudinal direction Y. The protrusion 823 protrudes outwardly from the respective side surface 822 of the mounting tab 825, and is sized to be smaller than the distance between the two support arms 352 of the elastic connecting arm 331, so the protrusion can not only be accommodated between the two support arms 352 of the elastic connecting arm 331 but can also move therebetween. The distance between the pair of side surfaces 822 is set such that the mounting tab 825 can be accommodated between the retaining sections 335 of the pair of elastic connecting arms 331 of the second compensation element 140, and the pair of side surfaces 822 are in contact with the retaining sections 335 of the pair of elastic connecting arms 331. An internal thread 828 is provided on an inner surface of the hole 821 for threaded connection with the external thread 231 on the first compensation element 130.

As shown in FIG. 8C, the tolerance compensation fastening assembly 100 can be pre-assembled to the first component 820. Specifically, to achieve the pre-assembled state, the tolerance compensation fastening assembly 100 is inserted, from its operation end 104 (see FIG. 1A), into the hole 821 in the mounting tab 825 of the first component 820 such that the external thread 231 of the first compensation element 130 is threadedly connected to the internal thread 828 on the inner surface of the hole 821, and the pair of elastic connecting arms 331 of the second compensation element 140 are respectively hung on the pair of protrusions 823 on the mounting tab 825. In the pre-assembled state, the retaining sections 335 of the pair of elastic connecting arms 331 of the second compensation element 140 are respectively in contact with the pair of side surfaces 822 of the mounting tab 825 of the first component 820, the radial bolt extension 112 is located outside the mounting tab 825 of the first component 820, and the bolt 110 is located in its introduction position.

Since the first compensation element 130 is threadedly connected to the mounting tab 825 of the first component 820, the first compensation element 130 can move relative to the first component 820 in the longitudinal direction Y. Since the shank 114 of the bolt 110 can radially move in the first receiving hole 210 of the first compensation element 130, and the elastic connecting arms 331 of the second compensation element 140 have elasticity, the second support portion 142 of the second compensation element 140 can move together with the bolt 110 relative to the first component 820 in the transverse directions X, Z.

As shown in FIG. 8D, the hole 845 in the inside element 843 of the second component 840 has a width of W, and the side length of the bottom surface 418 of the radial bolt extension 112 is smaller than the width W of the hole 845, but the diagonal of the bottom surface 418 is larger than the width W of the hole 845. Therefore, when a side of the bottom surface 418 of the radial bolt extension 112 is aligned with the width of the hole 845, the radial bolt extension 112 can be inserted into the hole 845, and after insertion, the radial bolt extension 112 is rotated so that the radial bolt extension 112 cannot be withdrawn from the hole 845 once the side of the bottom surface 418 of the radial bolt extension 112 is out of alignment with the width of the hole 845.

The hidden door handle module (first component 820) of the vehicle has a support body (not shown in the figures) in a simulated shape of a door handle cover plate. The support body is configured for the mounting of the door handle cover plate to ensure a consistent gap between the door handle cover plate and an edge of a handle hole (not shown) in the outer sheet metal (outside element 841) of the vehicle door. During mounting, the door handle module needs to be first mounted to the inner sheet metal of the vehicle door (the inside element 843 of the second component 840) from the inner side of the vehicle door by means of the tolerance compensation fastening assembly 100, such that the support body of the door handle module extends into the handle hole in the outer sheet metal of the vehicle door (the outside element 841 of the second component 840), and the gap between the peripheral edge of the support body and the edge of the handle hole is consistent, so that when the handle cover plate is mounted on the support body later, the gap between the peripheral edge of the handle cover plate and the edge of the handle hole is consistent.

The inner sheet metal (inside element 843) of the vehicle door is connected to the outer sheet metal (outside element 841) of the vehicle door, and the inner sheet metal (inside element 843) of the vehicle door is provided with holes 845 corresponding in number to the mounting tabs 825 of the door handle module (first component 820). Ideally, each hole 845 in the inner sheet metal (inside element 843) of the vehicle door is precisely positioned relative to the outer sheet metal (outside element 841) of the vehicle door so that the support body of the door handle module (first component 820) can be precisely positioned relative to the outer sheet metal (outside element 841) of the vehicle door. However, due to manufacturing and mounting tolerances, the hole 845 in the inner sheet metal (inside element 843) of the vehicle door often cannot be precisely positioned relative to the outer sheet metal (outside element 841) of the vehicle door, so that there may be tolerances in the longitudinal direction Y, or in the transverse directions X, Z relative to the ideal mounting position. The tolerance compensation fastening assembly 100 of the present disclosure can compensate for the tolerances in the longitudinal direction Y and in the transverse directions X, Z while fastening the first component 820 to the second component 840.

Figure 9A:
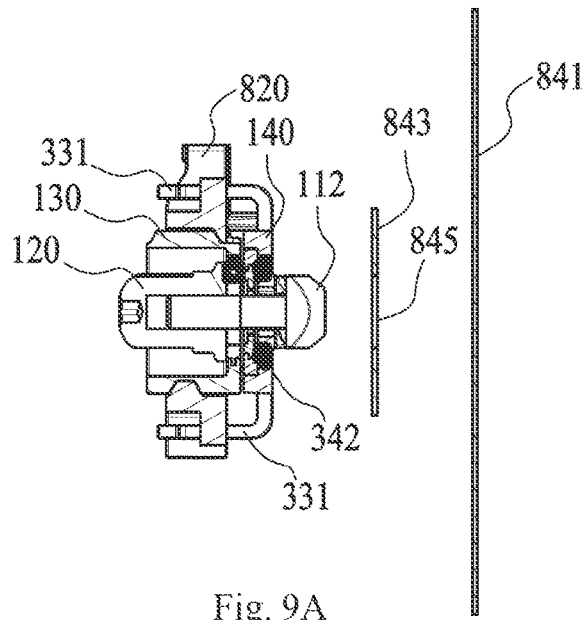
FIG. 9A is a cross-sectional view of a first step in a mounting process for fastening the tolerance compensation fastening assembly and the first component in the pre-assembled state shown in FIG. 8C to the second component.
Figure 9B:
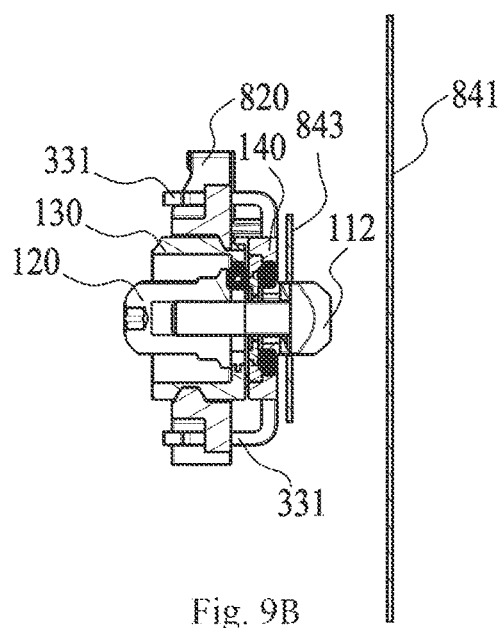
FIG. 9B is a cross-sectional view of a second step in the mounting process for fastening the tolerance compensation fastening assembly and the first component in the pre-assembled state shown in FIG. 8C to the second component shown in FIG. 8D.
Figure 9C:
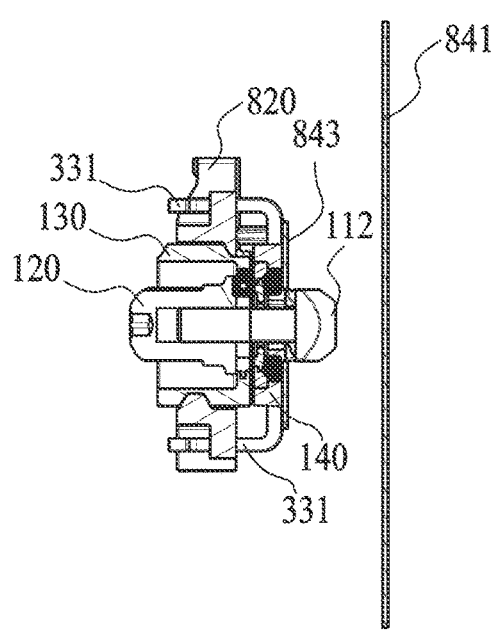
FIG. 9C is a cross-sectional view of a third step in the mounting process for fastening the tolerance compensation fastening assembly and the first component in the pre-assembled state shown in FIG. 8C to the second component shown in FIG. 8D.
Figure 9D:
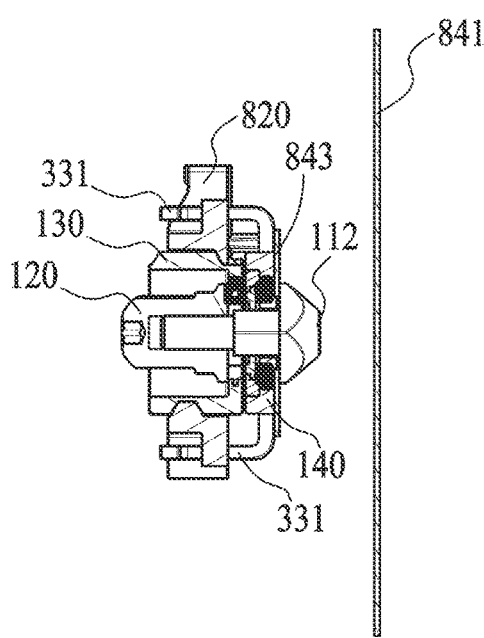
FIG. 9D is a cross-sectional view of a fourth step in the mounting process for fastening the tolerance compensation fastening assembly and the first component in the pre-assembled state shown in FIG. 8C to the second component shown in FIG. 8D.
Figure 9E:
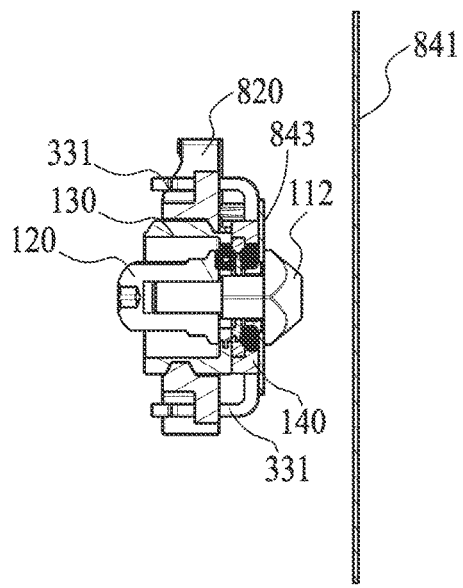
FIG. 9E is a cross-sectional view of a fifth step in the mounting process for fastening the tolerance compensation fastening assembly and the first component in the pre-assembled state shown in FIG. 8C to the second component shown in FIG. 8D.

FIGS. 9A-9E show an exemplary process for fastening the first component 820 to the second component 840 by the tolerance compensation fastening assembly 100 pre-assembled to the first component 820. As shown in FIG. 9A, in a first step, the radial bolt extension 112 of the bolt 110 (which is now in the introduction position) of the tolerance compensation fastening assembly 100 that is pre-assembled to each mounting tab 825 of the first component 820 is substantially aligned with the corresponding hole 845 of the inside element 843 of the second component 840. As shown in FIG. 9B, in a second step, the first component 820 is moved such that the radial bolt extension 112 is inserted into the hole 845 of the inside element 843. As shown in FIG. 9C, in a third step, the tolerance compensation fastening assembly 100 is pushed toward the inside element 843 of the second component 840 until the front side surface 342 of the second compensation element 140 abuts against the inside element 843 of the second component 840. As shown in FIG. 9D, in a fourth step, the nut 120 is rotated, so as to drive the bolt 110 to rotate by the nut 120, such that the radial bolt extension 112 is rotated away from its introduction position and reaches the locked position. As shown in FIG. 9E, in a fifth step, the nut 120 is continued to be rotated, such that the nut 120 drives the first compensation element 130 to move toward the inside element 843 of the second component 840 until the first support portion 132 of the first compensation element 130 abuts against the adjacent retainer 150 and cannot be moved further, the assembly process is completed.

In the second step above, since the shank 114 of the bolt 110 can radially move in the first receiving hole 210 of the first compensation element 130, and the elastic connecting arms 331 of the second compensation element 140 have elasticity, the second support portion 142 of the second compensation element 140 and the bolt 110 can move together in the transverse directions X, Z relative to the first component 820, so that even if multiple holes 845 in the second component 840 are not in the ideal mounting positions, the radial bolt extension 112 of the bolt 110 of the tolerance compensation fastening assembly 100 that is pre-assembled to each mounting tab 825 of the first component 820 can also be inserted into the corresponding hole 845 of the inside element 843 of the second component 840, thereby enabling the tolerances in the transverse directions X, Z to be compensated by the fastening device 100. In the fifth step above, since the first compensation element 130 can move relative to the first component 820 in the longitudinal direction Y, the amount of movement of the first compensation element 130 can be adjusted according to the tolerance of the longitudinal direction Y, thereby compensating for the tolerance in the longitudinal direction Y.

Figure 10:
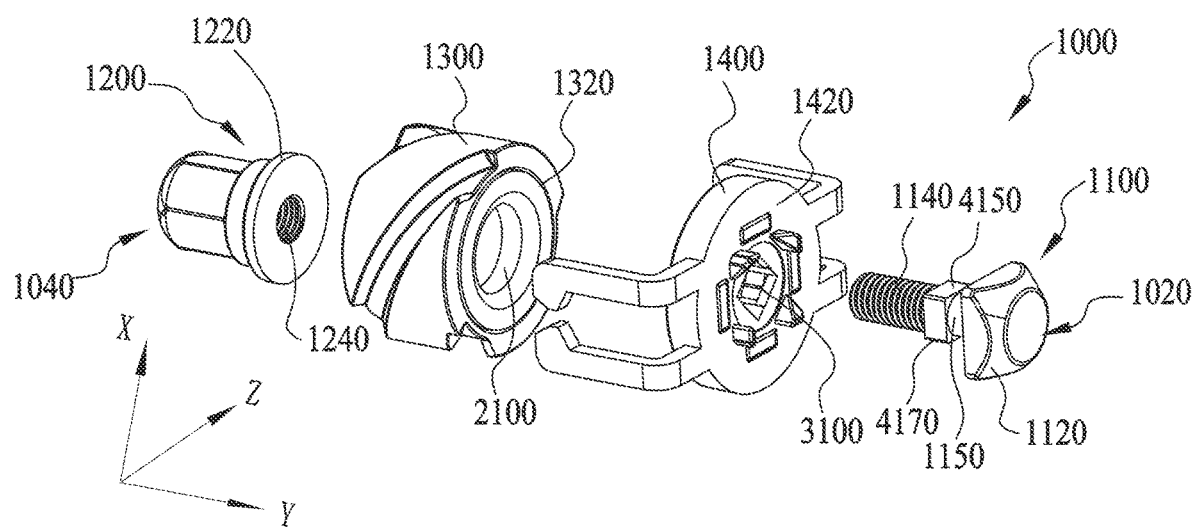
FIG. 10 is an exploded view of a tolerance compensation fastening assembly according to another embodiment of the present disclosure.

FIG. 10 is an exploded view of a tolerance compensation fastening assembly 1000 according to another embodiment of the present disclosure. The tolerance compensation fastening assembly 1000 of the embodiment shown in FIG. 10 is similar to the tolerance compensation fastening assembly 100 of the embodiment shown in FIGS. 1A and 1B, mainly except that the retaining means of the tolerance compensation fastening assembly 1000 is not formed by a separate retainer, but by structures on the second support portion of the second compensation element. In addition, the tolerance compensation fastening assembly 1000 is different from the tolerance compensation fastening assembly 100 in terms of the structures of the parts of the first support portion and the second support portion that are made of metal.

Specifically, as shown in FIG. 10, the tolerance compensation fastening assembly 1000 includes a fastener formed by a bolt 1100 and a nut 1200 mating with each other, a first compensation element 1300 and a second compensation element 1400. The bolt 1100 includes a shank 1140 having an external thread and a radial bolt extension 1120 radially extending from the shank 1140. The nut 1200 includes a threaded connection 1240 in the form of an internal thread and a radial nut extension 1220 radially extending from the threaded connection 1240. The first compensation element 1300 includes a first support portion 1320, and the second compensation element 1400 includes a second support portion 1420. The first support portion 1320 is provided with a first receiving hole 2100, and the second support portion 1420 is provided with a second receiving hole 3100. The first receiving hole 2100 and the second receiving hole 3100 are configured to receive the shank 1140 of the bolt 1100. Through the threaded engagement of the shank 1140 of the bolt 1100 and the threaded connection 1240 of the nut 1200, the first support portion 1320 of the first compensation element 1300 and the second support portion 1420 of the second compensation element 1400 are retained between the radial bolt extension 1120 and the radial nut extension 1220. In the fastened state, the first support portion 1320 and the second support portion 1420 are subjected to the axial fastening force exerted by the bolt 1100 and the nut 1200. The nut 1200 forms an operation end 1040 of the tolerance compensation fastening assembly 1000, and the bolt 1100 forms an insertion end 1020 of the tolerance compensation fastening assembly 1000.

Still as shown in FIG. 10, the bolt 1100 further includes a mating portion 4150 arranged on the shank 1140 of the bolt 1100. The mating portion also has a square cross-sectional shape which is similar to the mating portion 415 of the bolt 110 in the embodiment shown in FIGS. 1A and 1B, and also has several edges 4170. The difference is that the mating portion 415 of the bolt 110 in the embodiment shown in FIGS. 1A and 1B extends all the way to the radial bolt extension 112, while the mating portion 4150 of the bolt 1100 in FIG. 10 is separated from the radial bolt extension 1120 by a distance. An avoidance portion 1150 is formed at the part of the shank between the mating portion 4150 and the radial bolt extension 1120.

Figures 11A, 11B:
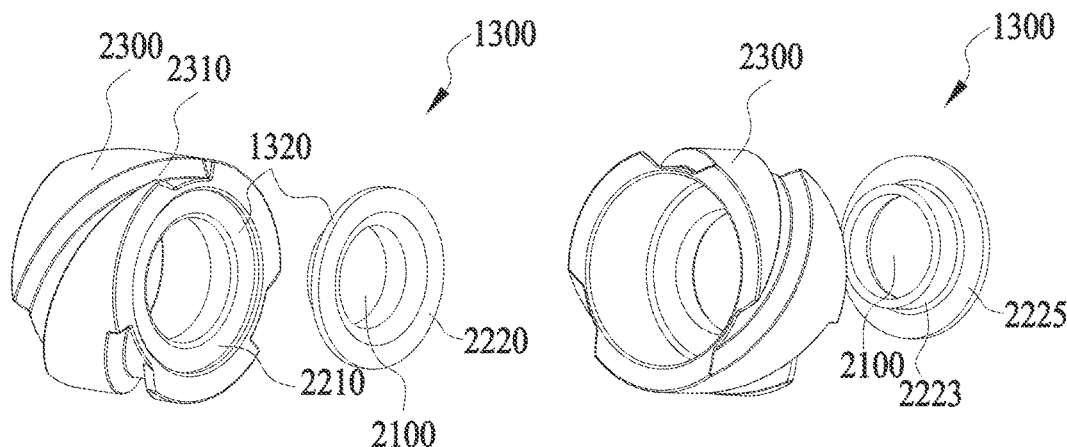
FIG. 11A is an exploded view of a second compensation element of the tolerance compensation fastening assembly shown in FIG. 10.
FIG. 11B is a perspective view of the second compensation element shown in FIG. 11A with a second metal ring part removed.

FIGS. 11A and 11B show the specific structures of the first compensation element 1300. FIGS. 11A and 11B are exploded views of the first compensation element 1300 respectively from two different perspectives. As shown in FIGS. 11A and 11B, the structure of the first compensation element 1300 is similar to that of the first compensation element 130 in the embodiment shown in FIGS. 1A and 1B, and also includes a tubular main body portion 2300 and a first support portion 1320 in the shape of an annular flange arranged at one end of the tubular main body portion 2300. An external thread 2310 is provided on an outer surface of the tubular main body portion 2300 for engaging with the internal thread 828 on the first component 820. The first support portion 1320 includes a first metal ring part 2220 and a first plastic part 2210. The first plastic part 2210 is connected to the end of the tubular main body portion 2300. The first metal ring part 2220 includes a radial extension ring 2223 and an axial extension ring 2225. The axial extension ring 2225 extends into the first plastic part 2210 and defines the first receiving hole 2100. The radial extension ring 2223 covers a radially-extending outer surface of the first plastic part 2210. The axial extension ring 2225 extends for a certain length and reaches at least a radially-extending inner surface of the first plastic part 2210, so as to be able to be in contact with the radial nut extension 1220 in the fastened state of the tolerance compensation fastening assembly 1000. In this way, in the fastened state of the tolerance compensation fastening assembly 1000, the first metal ring part 2220 can be in contact with the components (i.e., the radial nut extension 1220 and the second support portion 1420) adjacent to the first support portion 1320 in the longitudinal direction Y. The first metal ring part 2220 may be connected to the first plastic part 2210 in various ways, such as being integrally formed with the first plastic part through an insert injection molding process, or being connected to the first plastic part through an assembly process (e.g., interference fit).

Figures 12A, 12B:
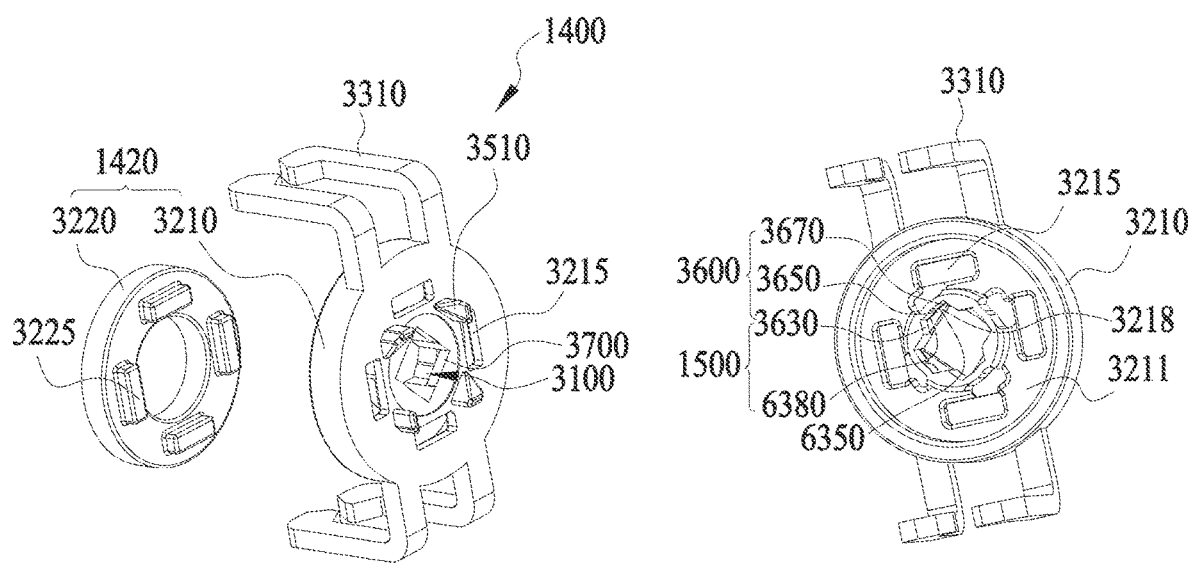
FIG. 12A is an exploded view of a first compensation element of the tolerance compensation fastening assembly shown in FIG. 10 from a first perspective.
FIG. 12B is an exploded view of the first compensation element of the tolerance compensation fastening assembly shown in FIG. 10 from a second perspective.

FIGS. 12A and 12B show the specific structures of the second compensation element 1400. FIG. 12A is an exploded view of the second compensation element 1400, and FIG. 12B is a perspective view of the second compensation element 1400 with a second metal ring part removed. As shown in FIGS. 12A and 12B, the second compensation element 1400 includes a second support portion 1420 and a pair of elastic connecting arms 3310. The second support portion 1420 is generally disc-shaped, and the pair of elastic connecting arms 3310 are respectively located on two opposite sides of the second support portion 1420 and are configured to connect the second support portion 1420 to the first component 820. The second support portion 1420 includes a second metal ring part 3220 and a second plastic part 3210. The second metal ring part 3220 is accommodated in an accommodation cavity 3211 defined by the second plastic part 3210. A part of the second plastic part 3210 extends into the second metal ring part 3220, and the second plastic part 3210 defines the second receiving hole 3100. Several connection protrusions 3225 are provided on the side of the second metal ring part 3220 facing the second plastic part 3210, and the second plastic part 3210 is provided with several connection holes 3215 for respectively receiving the number of connection protrusions 3225, so as to connect the second metal ring part 3220 to the second plastic part 3210. The second metal ring part 3220 may be integrally formed with the second plastic part 3210 through an insert injection molding process, or be connected to the second plastic part 3210 through an assembly process (e.g., interference fit). In the fastened state of the tolerance compensation fastening assembly 1000, the second metal ring part 3220 can be in contact with the first metal ring part 2220 of the first support portion 1320.

The second plastic part 3210 of the second support portion 1420 is provided with a guide section 3700, limiting means 3600 and retaining means 1500 around the second receiving hole 3100. In the embodiment shown in FIGS. 1A and 1B, the limiting means 360 and the retaining means 150 are arranged in different axial positions relative to the bolt 110. However, in the embodiment shown in FIG. 10, the limiting means 3600 and the retaining means 1500 are arranged in the same axial position relative to the bolt 1100. Furthermore, the guide section 3700 is arranged in a different axial position than the limiting means 3600 and the retaining means 1500.

Still as shown in FIGS. 12A and 12B, the guide section 3700 is arranged closer to the radial bolt extension 1120 than the limiting means 3600 and the retaining means 1500, and is configured to mate with the mating portion 4150 of the bolt 1100 (as shown in FIG. 10), so as to guide the insertion of the bolt 1100 into the second receiving hole 3100 in a desired orientation (an orientation corresponding to the locked position). To this end, the guide section 3700 defines a guide channel having a cross-section matching that of the mating portion 4150. The guide channel forms part of the second receiving hole 3100. When the mating portion 4150 of the bolt 1100 is inserted through the guide section 3700, by rotating the bolt 1100, the bolt 1100 can be rotated to the introduction position. During this process, the avoidance portion 1150 on the bolt 1100 mates with the guide section 3700, allowing the bolt 1100 to rotate. In addition, steps 3218 are formed between the guide section 3700 and the limiting means 3600/the retaining means 1500, for limiting the bolt 1100 from being withdrawn from the second receiving hole 3100 after being rotated to the introduction position.

The limiting means 3600 can mate with the mating portion 4150 of the bolt 1100 to define the introduction position and the locked position of the bolt 1100. The number of limiting means 3600 matches the number of mating structures on the mating portion 4150, and is four in the embodiment shown in the figures. The four limiting means 3600 are arranged rotationally symmetrically around the center of the second receiving hole 3100. Each limiting means 3600 includes a first-direction limiting edge 3630 and a second-direction limiting edge 3670 opposite to each other, and a rotation space 3650 defined between the first-direction limiting edge 3630 and the second-direction limiting edge 3670 and in communication with the second receiving hole 3100. The first-direction limiting edge 3630 and the second-direction limiting edge 3670 respectively correspond to the locked position and the introduction position of the bolt 1100, and the mating portion 4150 of the bolt 1100 can rotate in the rotation space 3650. When the bolt 1100 is in the introduction position, the mating portion 4150 of the bolt 1100 abuts against the first-direction limiting edge 3630, thereby blocking the bolt 1100 from leaving the introduction position in a first direction from the locked position to the introduction position; and when the bolt 1100 is in the locked position, the mating portion 4150 of the bolt 1100 abuts against the second-direction limiting edge 3670, thereby blocking the bolt 1100 from leaving the locked position in a second direction from the introduction position to the locked position.

The retaining means 1500 includes a retaining protrusion 6380 arranged between the first-direction limiting edge 3630 and the second-direction limiting edge 3670, and the first-direction limiting edge 3630. The retaining protrusion 6380 is provided on an inside engagement surface 6350 connected to the first-direction limiting edge 3630 and the second-direction limiting edge 3670. When the nut 1200 is subjected to a rotational force that is less than a preset threshold, the edge 4170 of the mating portion 4150 of the bolt 1100 can be retained between the first-direction limiting edge 3630 and the retaining protrusion 6380 to limit the rotation of the bolt 1100, thereby retaining the bolt 1100 in its introduction position.

Figure 13:
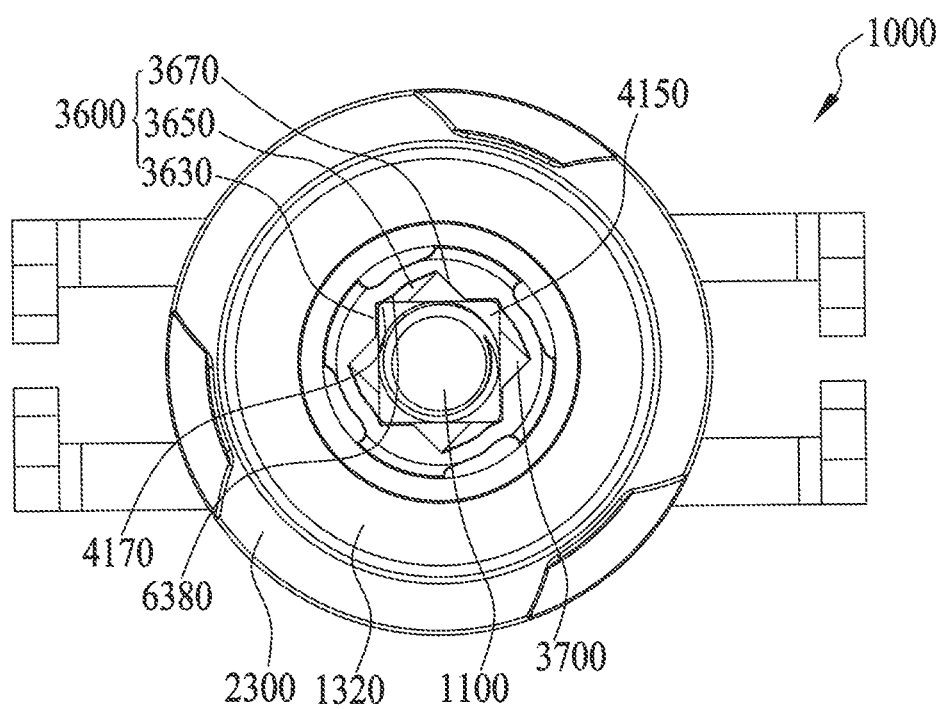
FIG. 13 is a side view of the tolerance compensation fastening assembly shown in FIG. 10 with a bolt in the introduction position and a nut removed.

FIG. 13 is a side view of the tolerance compensation fastening assembly 1000 with the bolt in the introduction position and the nut removed. As shown in FIG. 13A, when the bolt 1100 is in the introduction position, the edge 4170 of the mating portion 4150 of the bolt 1100 is retained between the first-direction limiting edge 3630 and the retaining protrusion 6380. When the nut 1200 is screwed with a force exceeding a preset threshold and thus the bolt 1100 is rotated in a clockwise direction in FIG. 13A, the mating portion 4150 of the bolt 1100 can deform the retaining protrusion 6380 so as to pass over the retaining protrusion 6380, so that the bolt 1100 can be rotated to the locked position. In the locked position, the mating portion 4150 of the bolt 1100 abuts against the second-direction limiting edge 3670.

After the first component is fastened to the second component via the tolerance compensation fastening assembly, the first support portion of the first compensation element and the second support portion of the second compensation element of the tolerance compensation fastening assembly are clamped between the radial nut extension and the radial bolt extension; therefore, the first support portion of the first compensation element, the retainer and the second support portion of the second compensation element are components that are subjected to the axial fastening force of the fastener, and their durability will affect the fastening effect of the tolerance compensation fastening assembly. If the first support portion of the first compensation element and the second support portion of the second compensation element are both made of plastic, the plastic material will creep under a high-temperature environment to create a gap between these components, so that the tolerance compensation fastening assembly will suffer from torque attenuation after prolonged use and it is no longer possible to clamp these components by means of the bolt and the nut. In the present disclosure, parts of the first support portion of the first compensation element and the second support portion of the second compensation element that overlap with the radial nut extension and the radial bolt extension in the longitudinal direction Y are at least partially made of metal; therefore, the tolerance compensation fastening assembly of the present disclosure has a relatively slow torque attenuation, and can adapt to relatively harsh use environments. Furthermore, the tolerance compensation fastening assembly of the present disclosure can define the introduction position and the locked position of the insertion end with a simple structure. The tolerance compensation fastening assembly of the present disclosure can also retain the insertion end in the introduction position with a simple structure, thereby facilitating transportation and assembly of the tolerance compensation fastening assembly.

Although the present disclosure is described in conjunction with the examples of embodiments outlined above, various alternatives, modifications, variations, improvements, and/or substantial equivalents that are known or current or to be anticipated before long may be obvious to those of at least ordinary skill in the art. Furthermore, the technical effects and/or technical problems described in this description are exemplary rather than limiting; therefore, the disclosure in this description may be used to solve other technical problems and have other technical effects and/or may solve other technical problems. Accordingly, the examples of the embodiments of the present disclosure as set forth above are intended to be illustrative rather than limiting. Various changes may be made without departing from the spirit or scope of the present disclosure. Therefore, the present disclosure is intended to embrace all known or earlier disclosed alternatives, modifications, variations, improvements, and/or substantial equivalents.

I claim:

1. A tolerance compensation fastening assembly for fastening a first component having an opening with an internal thread provided on an inner surface thereof to a second component, the tolerance compensation fastening assembly comprising:
    a first compensation element comprising a first support portion having a first metal ring part connected to a first plastic part, the first support portion being provided with a first receiving hole, the first receiving hole being configured to receive a shank of a fastener,
        wherein the fastener comprises a bolt defining the shank and a radial bolt extension radially extending from the shank, and a nut defining a threaded connection and a radial nut extension radially extending from the threaded connection, and the threaded connection being threadedly connectable to the shank, and
        wherein the first compensation element comprises a threaded portion on an outer surface thereof that is configured to threadedly engage the internal thread of the first component and movable relative to the first component in a longitudinal direction; and
    a second compensation element comprising a second support portion having a second metal ring part connected to a second plastic part, the second support portion being provided with a second receiving hole, the second receiving hole being configured to receive the shank of the fastener, wherein the second support portion is configured to be connectable to the first component and movable relative to the first component in at least one transverse direction perpendicular to the longitudinal direction,
        wherein the first support portion and the second support portion are configured to be subjected to an axial fastening force applied by the fastener,
        wherein the first metal ring part and the second metal ring part at least partially overlap with the radial bolt extension and the radial nut extension in the longitudinal direction,
        wherein the first support portion and the second support portion are located between the radial bolt extension and the radial nut extension, and
        wherein parts of the first support portion and the second support portion that overlap with the radial bolt extension and the radial nut extension in the longitudinal direction are at least partially made of metal.

2. The tolerance compensation fastening assembly according to claim 1, wherein:
    the first metal ring part of the first support portion is integrally formed with the first plastic part through an insert injection molding process, or is connected to the first plastic part through an assembly process; and
    the second metal ring part of the second support portion is integrally formed with the second plastic part through an insert injection molding process, or is connected to the second plastic part through an assembly process.

3. The tolerance compensation fastening assembly according to claim 1, further comprising:
    an insertion end configured to be inserted into the first component and an operation end opposite to the insertion end, the insertion end being formed by one of the bolt and the nut, and the operation end being formed by the other of the bolt and the nut, wherein the one of the bolt and the nut that forms the insertion end comprises an introduction position and a locked position and is configured to be rotatable between the introduction position and the locked position, and wherein the one of the bolt and the nut that forms the insertion end comprises a mating portion; and
    a limiting structure provided on the second support portion around the second receiving hole, and the limiting structure being configured to mate with the mating portion to define the introduction position and the locked position.

4. The tolerance compensation fastening assembly according to claim 1, wherein:
    the first compensation element comprises a tubular main body portion, and the first support portion is an annular flange arranged at one end of the tubular main body portion, wherein the tubular main body portion is provided with the threaded portion;
    wherein the second compensation element further comprises a pair of elastic connecting arms respectively located on opposite sides of the second support portion, and the second support portion is connected to the first component via the pair of elastic connecting arms.

5. The tolerance compensation fastening assembly according to claim 1, wherein the second compensation element further comprises a pair of elastic connecting arms respectively located on opposite sides of the second support portion, and the second support portion is connected to the first component via the pair of elastic connecting arms.

6. A tolerance compensation fastening assembly for fastening a first component to a second component, the tolerance compensation fastening assembly comprising:
    a first compensation element comprising a first support portion, the first support portion being provided with a first receiving hole, the first receiving hole being configured to receive a shank of a fastener, wherein the first compensation element is configured to be connectable to the first component and movable relative to the first component in a longitudinal direction; and
    a second compensation element comprising a second support portion, the second support portion being provided with a second receiving hole, the second receiving hole being configured to receive the shank of the fastener, wherein the second support portion is configured to be connectable to the first component and movable relative to the first component in at least one transverse direction perpendicular to the longitudinal direction, wherein the first support portion and the second support portion are configured to be subjected to an axial fastening force applied by the fastener, and wherein the first support portion and the second support portion are at least partially made of metal, a limiting structure provided on the second support portion around the second receiving hole, and the limiting structure being configured to mate with a mating portion to define an introduction position and a locked position, wherein the limiting structure comprises a first-direction limiting edge and a second-direction limiting edge opposite to each other, and a rotation space defined between the first-direction limiting edge and the second-direction limiting edge and in communication with the second receiving hole, the first-direction limiting edge corresponding to the introduction position, and the second-direction limiting edge corresponding to the locked position, wherein the one of a bolt and a nut that forms an insertion end is rotatable in the rotation space.

7. The tolerance compensation fastening assembly according to claim 6, further comprising:

retaining means being configured to mate with the mating portion such that the one of the bolt and the nut that forms the insertion end is retained in the introduction position when an operation end is subjected to a rotational force that is less than a preset threshold.

8. The tolerance compensation fastening assembly according to claim 7, wherein:

the retaining means comprise a retainer arranged between the first support portion and the second support portion, and the second support portion mates with the retainer to limit the rotation of the retainer relative to the second support portion;

wherein part of the retainer that overlaps with the first support portion, and the second support portion in the longitudinal direction is at least partially made of metal.

9. The tolerance compensation fastening assembly according to claim 7, wherein:

the retaining means comprise structures provided on the second support portion around the second receiving hole.

10. The tolerance compensation fastening assembly according to claim 7, wherein:

the retaining means and the limiting structure are arranged at different axial positions of the tolerance compensation fastening assembly, and the retaining means comprise at least two retaining ribs, the at least two retaining ribs being made of plastic and configured to be deformable when subjected to a certain rotational force; and the mating portion comprises at least one edge, the at least one edge being retainable between the at least two retaining ribs.

11. The tolerance compensation fastening assembly according to claim 7, wherein:

the retaining means and the limiting structure are arranged at the same axial position of the tolerance compensation fastening assembly, and the retaining means comprises a retaining protrusion located between the opposite first-direction limiting edge and second-direction limiting edge, the retaining protrusion being made of plastic and configured to be deformable when subjected to a certain rotational force; and the mating portion comprises at least one edge, the at least one edge being retained between the first-direction limiting edge and the retaining protrusion.

* * * * *